C. Foster,
Cutting Metal Comb-Teeth,
N° 78,585. Patented June 2, 1868.
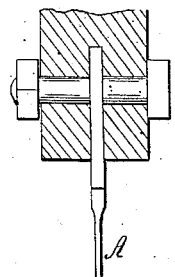
Fig. 1
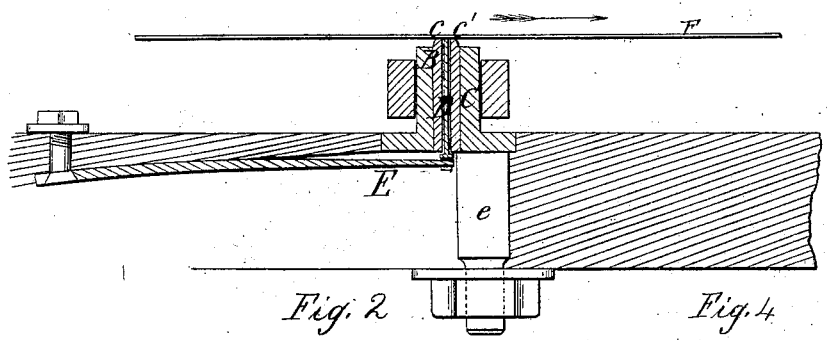
Fig. 2
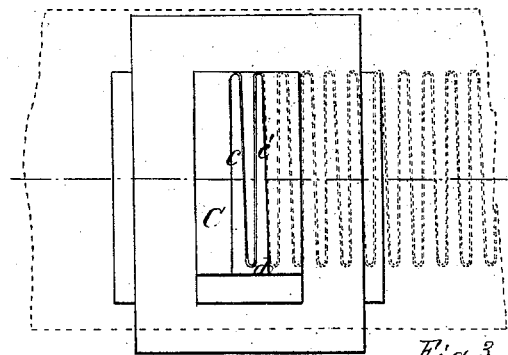
Fig. 3
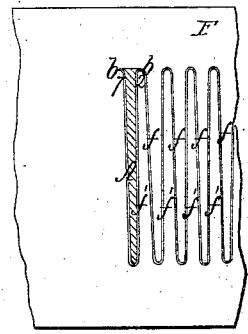
Fig. 4
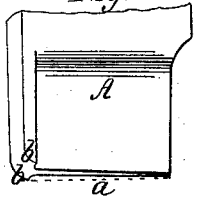
Witnesses
Jno. D. Patten
H. S. Miller
Inventor
C. Foster,
By atty
A. B. Stoughton.

United States Patent Office.

CALEB FOSTER, OF WAPPINGER'S FALLS, NEW YORK, ASSIGNOR TO ELIAS BROWN, OF SAME PLACE.

*Letters Patent No. 78,585, dated June 2, 1868.*

IMPROVED DIES FOR CUTTING THE TEETH OF METALLIC COMBS.

*The Schedule referred to in these Letters Patent and making part of the same.*

TO ALL WHOM IT MAY CONCERN:

Be it known that I, CALEB FOSTER, of Wappinger's Falls, in the county of Dutchess, and State of New York, have invented a new and useful Improvement in Dies for Cutting the Teeth of Metallic Combs; and I do hereby declare that the following is a full, clear, and exact description thereof, which will enable those skilled in the art to make and use the same, reference being had to the accompanying drawings, forming part of this specification.

This invention relates to a new and useful improvement in the manufacture of metallic combs of all kinds, more especially those which are generally termed "long combs," and are worn by children at the back part of the head.

The invention consists in the means employed for forming the teeth of such combs, said means comprising male and female cutters or dies, and a follower or plunger, all arranged to operate in such a manner that two combs will be formed simultaneously out of one piece of steel or other metal plate, the teeth of one comb being formed by the metal which was included between the spaces of the teeth of the other, the teeth of both combs being perfectly formed throughout, and properly pointed by one operation.

In the accompanying sheet of drawings—

Figure 1 is a side sectional view of my invention taken in the line x x, fig. 2.

Figure 2, a plan or top view of the female cutter or die, and plunger or follower.

Figure 3, a side view of the male cutter or die.

Figure 4, a side view of a portion of a cut plate, showing the two sets of teeth of the two combs.

Similar letters of reference indicate corresponding parts.

A represents a male cutter or die, constructed out of a steel plate, and having an edge or face, $a$, corresponding in form and area to the teeth to be cut.

This edge or face of the cutter or die is, when the die is secured in working position, slightly inclined from a horizontal plane, the narrowest end of the face being a trifle the lowest, (see fig. 3,) and the opposite and widest end of the face has a cutting-lip, $b$, projecting at right angles from each side of it, but having slightly concave cutting-edges.

This male cutter or die is secured in any suitable stock, arranged so as to have a rising and falling movement.

B represents the female cutter or die, which has two cutting-edges, $c\ c'$, with a space between them of sufficient width to allow the male cutter or die A to pass snugly down between them each time it descends, the space between the cutting-edges $c\ c'$ corresponding in shape and dimensions to the face of the male cutter or die.

The female cutter or die, at its narrow end, designated by $d$, extends entirely around, to correspond in shape or form to the points of the teeth of the combs, and the corresponding end of the face of the male cutter or die A being of similar form.

The opposite and wider end of the die B is open, the cutting-edges $c\ c'$ not being connected, as shown in fig. 2.

The female die is fitted within a suitable stock, C, which is secured to a bed by a bolt, $e$, and within the female die there is fitted a follower or plunger, D, which is allowed to work freely up and down, and has a spring, E, bearing against its lower end, which spring has a tendency to keep the follower or plunger elevated, so that its upper end will be flush with the cutting-edges $c\ c'$, (see fig. 1.)

The operation is as follows:

A piece of steel or other metal plate, F, of the proper dimensions, is placed on the female cutter or die B, and each time the male cutter or die A descends, a tooth, $f$, is cut or punched in the plate F, the follower or plunger D being forced down within the female die.

As the male die rises, the plunger D, and consequently the tooth $f$, is forced upward under the action of the spring E, the tooth $f$ by this means being forced up out of the female die, a result which is essential to the operation of the machine, as it admits of the plate F being fed along after the cutting of each tooth, and during the upward movement of the male cutter or die.

If the teeth are not forced up out of the female die, it will of course be seen that the plate F cannot be fed along.

The plate F is fed along as the male cutter or die rises, and at a distance equal to the width of a tooth, so that the spaces between the teeth $f$, which are punched and forced down into the female cutter or die, and which are on one comb, will form the teeth $f'$ of the other or fellow-comb.

It will be understood that the outer ends of the teeth $f$ are pointed in proper form at the narrow end, $d$, of the female cutter or die B.

The outer ends of the teeth $f'$ of the other comb are pointed by the cutting-lips $b$, one side of the points of said teeth being acted upon by a lip, $b$, as a tooth, $f$, is punched, as shown at 1, fig. 4, and the other half acted upon by the other lip when the succeeding tooth $f$ is punched, as shown at 2, in the same fig. 4.

I am aware that in the manufacture of horn combs two are cut simultaneously of one piece of horn, the teeth of one comb being formed of the material included between the spaces of the teeth of the other comb; but in this case cutters are used instead of dies, the teeth being formed by cutting instead of punching, and two cuts being necessary to form each tooth.

The tool, therefore, as well as the mode of operation, in the manufacture of horn combs, is essentially different from that described as my invention.

I claim as new, and desire to secure by Letters Patent—

The combination of the male and female dies A B, follower or plunger D, spring E or its equivalent, and the cutting-lips $b\ b$ on the male die, all arranged for joint operation, substantially in the manner as and for the purpose specified.

CALEB FOSTER.

Witnesses:
E. M. GORING,
THOMAS STEVENSON.